(12) United States Patent
Zeiger et al.

(10) Patent No.: US 8,890,674 B2
(45) Date of Patent: Nov. 18, 2014

(54) DRIVER ASSISTANCE DETECTION SYSTEM

(75) Inventors: David Zeiger, Mundelein, IL (US);
Young Son, Glenview, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 491 days.

(21) Appl. No.: 13/155,033

(22) Filed: Jun. 7, 2011

(65) Prior Publication Data

US 2012/0313770 A1 Dec. 13, 2012

(51) Int. Cl.
*B60Q 1/00* (2006.01)
*B60K 35/00* (2006.01)
*B60W 50/14* (2012.01)

(52) U.S. Cl.
CPC ............ *B60K 35/00* (2013.01); *B60W 2420/42* (2013.01); *B60K 2350/962* (2013.01); *B60K 2350/906* (2013.01); *B60K 2350/1096* (2013.01); *B60W 2550/402* (2013.01); *B60W 2550/20* (2013.01); *B60W 2520/10* (2013.01); *B60K 2350/352* (2013.01); *B60W 50/14* (2013.01)
USPC ............... 340/441; 340/439; 340/937; 701/2; 701/36; 701/70; 348/148; 348/169; 382/103

(58) Field of Classification Search
USPC ........ 340/441, 937, 988, 439, 438; 701/36, 2, 701/300, 117, 70; 345/7, 148; 348/148, 348/169, 159; 382/103, 104, 105
See application file for complete search history.

(56) References Cited

U.S. PATENT DOCUMENTS

| 6,801,638 | B1 * | 10/2004 | Janssen et al. ................. 382/104 |
| 6,969,183 | B2 * | 11/2005 | Okubo et al. ................. 362/466 |
| 7,058,206 | B1 * | 6/2006 | Janssen et al. ................. 382/104 |
| 7,183,944 | B2 * | 2/2007 | Gutta et al. ................... 340/937 |
| 7,394,356 | B2 * | 7/2008 | Kumabe et al. ............... 340/436 |
| 8,170,795 | B2 * | 5/2012 | Brulle-Drews et al. ....... 701/431 |
| 8,223,038 | B2 * | 7/2012 | Bauer et al. ................... 340/905 |
| 8,254,635 | B2 * | 8/2012 | Stein et al. .................... 382/103 |
| 2002/0186201 | A1 * | 12/2002 | Gutta et al. ................... 345/156 |
| 2003/0100976 | A1 * | 5/2003 | Watanabe et al. ................. 701/1 |
| 2004/0204157 | A1 | 10/2004 | Remboski et al. |
| 2004/0252027 | A1 | 12/2004 | Torkkola et al. |

(Continued)

FOREIGN PATENT DOCUMENTS

| DE | 102009041196 A1 | 3/2011 |
| EP | 1992538 A2 | 11/2008 |

OTHER PUBLICATIONS

Jonathan Ramsey "Audi traffic light detection System gets the green-light", http://www.autoblog.com/2008/09/21/audi-traffic-light-detection-system-gets-the-green-light/, Sep. 21, 2008.

(Continued)

*Primary Examiner* — Hoi Lau

(57) ABSTRACT

A driver assistance detection system and method for determining levels of functionality of an interactive device in a vehicle are provided. The driver assistance detection system comprises a vision-based detection device, a processing device, and an interactive device. The vision-based detection device is configured to visually detect objects, recognize whether the object is an object of interest, and then obtain data regarding a status of the object. The processing device is configured to receive data from the vision-based detection device, run a set of instructions and switch the interactive device between a first mode and a second mode. The interactive device is configured to have at least two modes, wherein the second mode has reduced functionality relative to the first mode.

17 Claims, 3 Drawing Sheets

(56) References Cited

U.S. PATENT DOCUMENTS

| | | | |
|---|---|---|---|
| 2006/0097858 A1* | 5/2006 | Kumabe et al. | 340/435 |
| 2006/0142941 A1* | 6/2006 | Imai et al. | 701/211 |
| 2009/0058845 A1* | 3/2009 | Fukuda et al. | 345/214 |
| 2009/0074249 A1* | 3/2009 | Moed et al. | 382/104 |
| 2010/0033571 A1* | 2/2010 | Fujita et al. | 348/149 |
| 2010/0157061 A1* | 6/2010 | Katsman et al. | 348/149 |
| 2010/0182140 A1* | 7/2010 | Kohno et al. | 340/438 |
| 2010/0207751 A1* | 8/2010 | Follmer et al. | 340/439 |
| 2010/0208072 A1* | 8/2010 | Murano et al. | 348/148 |
| 2010/0253597 A1* | 10/2010 | Seder et al. | 345/7 |
| 2010/0289632 A1* | 11/2010 | Seder et al. | 340/436 |
| 2010/0289633 A1 | 11/2010 | Aryal et al. | |
| 2010/0292886 A1* | 11/2010 | Szczerba et al. | 701/29 |
| 2010/0299189 A1* | 11/2010 | Tanaka | 705/14.4 |
| 2010/0302361 A1* | 12/2010 | Yoneyama et al. | 348/135 |
| 2010/0312446 A1* | 12/2010 | Schofield et al. | 701/70 |
| 2010/0316255 A1* | 12/2010 | Mathony et al. | 382/103 |
| 2011/0093179 A1* | 4/2011 | Schofield et al. | 701/93 |
| 2011/0128139 A1* | 6/2011 | Tauchi et al. | 340/439 |
| 2011/0205042 A1* | 8/2011 | Takemura et al. | 340/435 |

OTHER PUBLICATIONS

International Search Report and Written Opinion dated Aug. 14, 2012, from corresponding International Patent Application No. PCT/US2012/040924.

* cited by examiner

DRIVER ASSISTANCE DETECTION SYSTEM

TECHNICAL FIELD

The invention relates generally to apparatus and methods for assisting the driver of a vehicle by controlling distractions between driver and in-vehicle interactive technology.

BACKGROUND

As the amount of technology incorporated into a vehicle increases, so does the amount of information available to the driver and passengers of the vehicle. This information may become distracting to the driver while the vehicle is moving, especially when there is some level of interaction required. As a result, select interactive features in the vehicle may be disabled or restricted when the vehicle is in motion.

Disabling the interactive features of the vehicle based only on whether the vehicle is moving or stopped, however, may not be desirable. There may be situations when the vehicle is stopped for very short sessions, such as at a stop sign or stop-and-go heavy traffic, when enabling the interactive features is not ideal. On the other hand, there may be situations when the vehicle is stopped for longer periods and enabling select interactive features would be less of a distraction, such as at a traffic signal or railroad crossing. However, when the driver is engaged with the interactive features, the driver's attention may be diverted from the relevant traffic situation, such as a changing traffic signal or the opening of the railroad crossing.

To optimize the driver's access to the interactive features, it would be desirable to have the interactive features enabled or disabled based on more than just the motion of the vehicle by monitoring and adapting to the changes of the vehicle's surrounding environment.

SUMMARY

In an embodiment, a driver assistance detection system comprises a vision-based detection device, a processing device, and an interactive device. The vision-based detection device is configured to detect an object and obtain data regarding the object and a status of the object. The interactive device is configured to have at least a first mode and a second mode, wherein the second mode is configured to have reduced functionality relative to the first mode. The processing device is configured to receive data regarding the object and the status of the object, run a set of instructions using the data, and output data to the interactive device that switches the interactive device between the first mode and the second mode.

In an embodiment, a method is provided for assisting a driver of a vehicle by configuring an interactive device to have levels of functionality at predefined circumstances. The method includes scanning the surroundings of the vehicle for an object, detecting the status of the object, determining whether the status of the object meets a criteria, enabling the interactive device to be in a first mode if the criteria is met, monitoring the status of the object for changes, determining if the change in status meets the criteria, and enabling the interactive device in a second mode when the criteria is not met.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
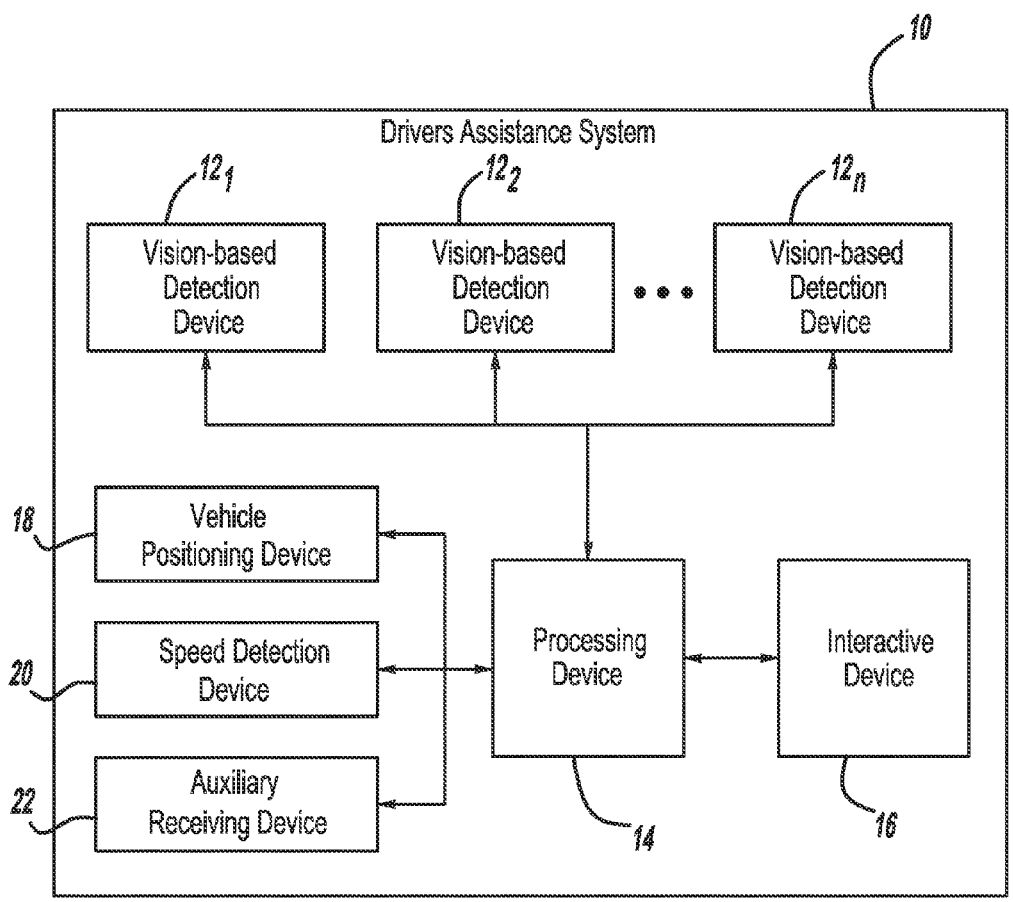
FIG. 1 is a block diagram of an embodiment of the driver assistance detection system.
Figure 2:
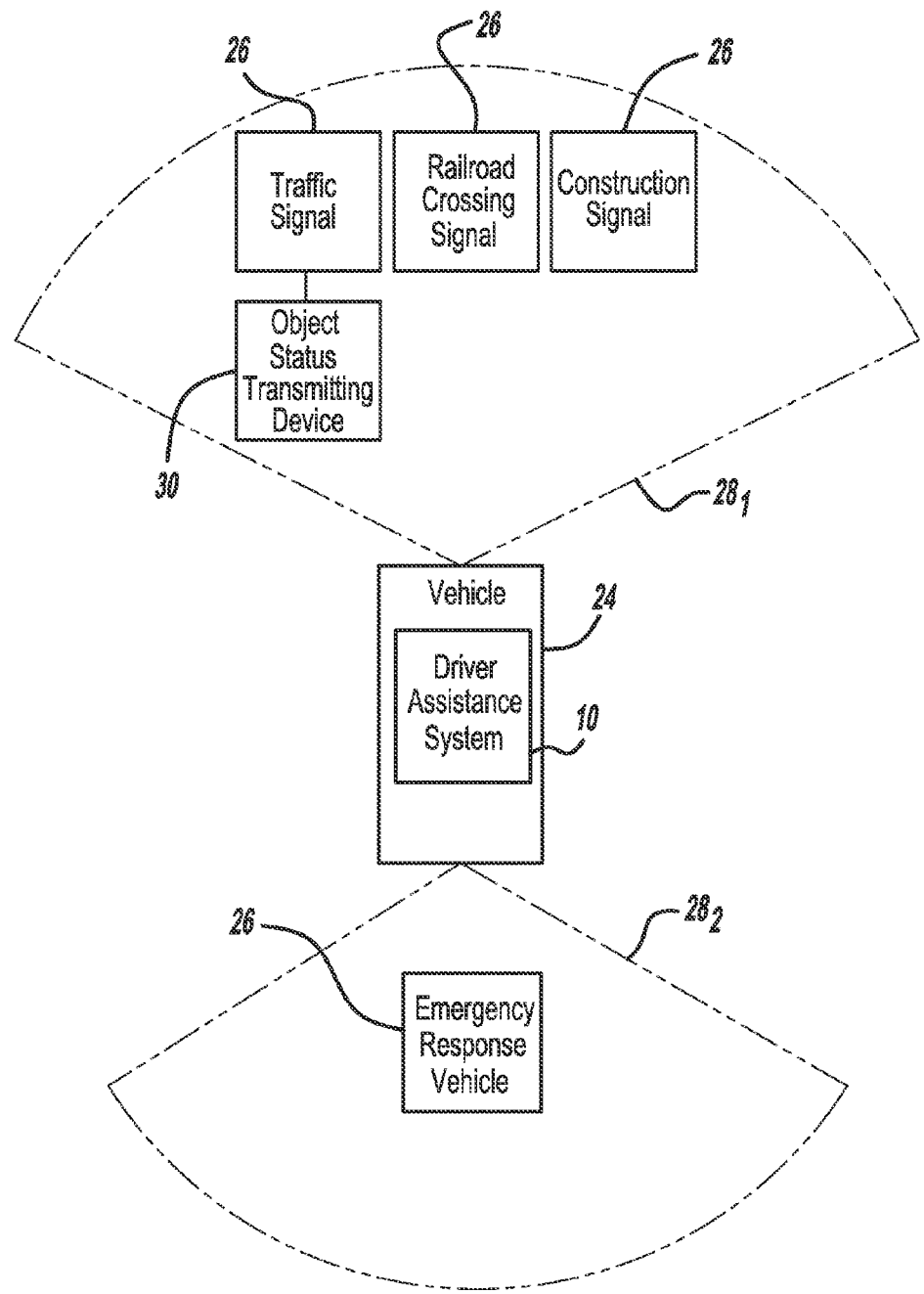
FIG. 2 is a block diagram of an embodiment of the driver assistance detection system in a vehicle with the surrounding environment containing various objects.

FIG. 1 is a block diagram of an embodiment of a driver assistance detection system 10. The driver assistance detection system 10 may comprise a vision-based detection device 12, a processing device 14, and an interactive device 16. Additionally, the driver assistance detection system 10 may further comprise a vehicle positioning device 18, a speed detection device 20, and an auxiliary receiving device 22. FIG. 2 is a block diagram of the driver assistance detection system 10 in a vehicle 24 and generally illustrates various types of objects 26 that may be detected when within a field of view 28 of the vision-based detection device 12.

Referring to FIGS. 1 and 2, the vision-based detection device 12 is an apparatus that is capable of visually detecting an object 26, recognizing the object 26, and then obtaining data regarding a status of the object 26. For example, the vision-based detection device 12 may visually scan its surrounding environment for an object 26. After detecting the object 26, the vision-based detection device 12 may compare the object 26 that has been detected to determine if the object 26 is recognized as an object of interest. An object of interest is a predefined object which may have a status relevant to the driver assistance detection system 10. An object of interest may be an object 26 that has more than one status that may be visually detected. After the vision-based detection device 12 recognizes the object 26, the vision-based detection device 12 may obtain data regarding the status of the object 26 from visual cues relevant to the object 26. The vision-based detection device 12 may then send data regarding the object 26 and status of the object 26 to the processing device 14. In an exemplary embodiment, the vision-based detection device 12 can comprise the system described and illustrated in U.S. Pat. No. 7,158,015 titled "Vision-Based Method and System for Automotive Parking Aid, Reversing Aid, and Pre-Collision Sensing Application" which is hereby incorporated by reference in its entirety. Implementation of the vision-based detection device 12 into the driver assistance detection system 10 in view of the foregoing enabling description would require no more than routine application of programming skills by one of ordinary skill in the art. Although a particular vision-based detection device 12 has been described in detail, other vision-based detection devices 12 that are known to those of skill in the art may be used in connection with the driver assistance detection system 10 in various other embodiments of the invention.

In an embodiment, the vision-based detection device 12 may comprise a camera and a computing device. The camera may be a video camera capable of capturing a plurality of images. The images may be color, grayscale, black and white, or other formats known by those with skill in the art. The computing device may receive the images captured by the camera. The computing device may be any programmable apparatus that receives input, stores and manipulates data, and provides output in a useful format. The computing device may also be integrated with the processing device 14 of the driver assistance detection system 10. The computing device may be capable of analyzing the images to determine if the images contains a predefined object. In an embodiment, the computing device may use color segmentation techniques to determine the shape of an object 26 by comparing contrasting image colors to determine the edges of an object 26. In another embodiment, the computing device may use contrast comparison techniques to determine the shape of an object 26 by comparing contrast of the grayscale image to determine the edges of an object 26.

Once the edges of the object 26 are determined, the shape formed by those edges may be compared to predefined objects to determine if the object 26 is recognized as an object of interest. If the vision-based detection device 12 recognizes the object 26 in the image as an object of interest, the vision-based detection device 12 may then attempt to detect the status of the object 26 using methods by those with knowledge in the art. For example and without limitation, the vision-based detection device 12 may use visual cues to detect portions of the image that appear illuminated or that lack illumination to detect the status of the object 26.

Additionally, the vision-based detection device 12 may monitor the object 26 detected in the image for a change in status. For example, in an embodiment where the vision-based detection device 12 comprises a video camera, subsequent frames of video images may be analyzed by the computing device of the vision-based detection device 12 to monitor for changes in status of the object 26. The number of subsequent frames analyzed and/or the amount of time between frames whiling monitoring the object 26 may vary. The number of frames and the amount of time between frames can be a user-specified parameter in an embodiment and can be set based on several factors, including, but not limited to the particular equipment used by the vision-based detection device 12.

The vision-based detection device 12 may have a plurality of modes in an embodiment of the invention. For example and without limitation, the vision-based detection device 12 may have a standby mode and an active mode. The standby mode may be a mode with reduced functionality relative to the active mode. The standby mode may also be used to conserve power. The active mode may be a mode with full functionality. The active mode may be used when the vision-based detection device 12 is attempting to detect objects 26. In an embodiment, the vision-based detection device 12 may be in the standby mode by default and switch to the active mode only when required.

In an embodiment where the driver assistance detection system 10 also includes the vehicle positioning device 18 (described in more detail below), the vision-based detection device 12 may use the data regarding the vehicle location to determine the current mode of the vision-based detection device 12. For example, the vision-based detection device 12 may use data regarding the vehicle location, correlate it with map data containing street intersections, railroad crossings, and/or known locations of objects of interest to determine when the vehicle 24 is approaching a location where objects of interest are likely exist or are known to exist, such as, but not limited to, street intersections, railroad crossings, and constructions zones. The map data may already exist in the vehicle 24, such as the map data in a navigation unit and/or the map data may be stored in the computing device as part of the vision-based detection device 12. Therefore, when the vehicle 24 is proximate to a location likely to have or known to have objects of interest, the vision-based detection device 12 may switch from the standby mode to the active mode. When the vehicle 24 is no longer proximate to a location likely to have or known to have objects of interest, the vision-based detection device 12 may switch from the active mode to the standby mode.

The vehicle positioning device 18 is an apparatus configured to obtain data regarding the vehicle location. The vehicle positioning device 18 may be connected to the vision-based detection device 12 and/or the processing device 14 and may provide the data regarding the vehicle location to the vision-based detection device 12 and/or the processing device 14. In an embodiment, the vehicle position device may comprise an antenna configured to receive global positioning satellite ("GPS") signals. In an embodiment, the vehicle positioning device 18 may be integrated with the vehicle's navigation system.

In an embodiment where the driver assistance detection system 10 also includes the speed detection device 20 (described in more detail below), the vision-based detection device 12 may use the data regarding the vehicle speed to determine which mode the vision-based detection device 12 should currently be in. The vision-based detection device 12 may use the data regarding the vehicle speed to determine when the vehicle 24 has stopped or reduced speed below a threshold criteria. The threshold criteria may be a user specified parameter in accordance with an embodiment of the invention. When the vehicle 24 has stopped or reduced speed below the threshold criteria, the vision-based detection device 12 may switch from the standby mode to the active mode. When the vehicle 24 starts moving or has a speed above the threshold criteria, the vision-based detection device 12 may switch from the active mode to the standby mode.

The speed detection device 20 is an apparatus configured to obtain data regarding the current speed of the vehicle 24. The speed detection device 20 may be connected to the vision-based detection device 12 and/or the processing device 14. The speed detection device 20 may obtain the speed of the vehicle 24 by methods known to those with skill in the art. In an embodiment, the speed detection device 20 may be integrated with components already existing in the vehicle 24 which obtain data regarding the speed. In an embodiment, the speed detection device 20 may have a speed sensor dedicated to the driver assistance detection system 10.

The processing device 14 is an apparatus configured to receive input data from the vision-based detection device 12, the vehicle positioning device 18, the speed detection device 20, and/or the auxiliary receiving device 22, execute instructions, and generate output to the interactive device 16 which may determine the operation mode of the interactive device 16. The processing device 14 may be connected to the vision-based detection device 12, the vehicle positioning device 18, the speed detection device 20, the auxiliary receiving device 22, and/or the interactive device 16. The processing device 14 may comprise any type of processor or multiple processors, a microprocessor known as single integrated circuits, a plurality of integrated circuits, and/or any suitable number of integrated circuit devices working in cooperation to accomplish the functions of the processing device 14 as known by those of skill in the art. Circuitry for accomplishing the functions of the processing device 14 and/or implementing the instructions referenced above in a control algorithm can be readily provided by those having ordinary skill in the art after becoming familiar with the teachings herein. The processing device 14 may also comprise a memory component and may store one or more instructions on the memory component. In an embodiment of the invention, the processing device 14 may be integrated with other apparatus existing in the vehicle. For example, embodiments of the processing device 14 may have the processing device 14 integrated with the Electronic Control Module (ECM), telematic system, or other apparatus with processing capabilities known to those with skill in the art. In other embodiments, the processing device 14 may be integrated with the computing device of the vision-based detection device 12. The processing device 14 may also be a processor dedicated to the driver assistance detection system 10.

The interactive device 16 may have a user interface that has functionality to send and receive information to and from the driver and/or other occupants in the vehicle 24. The interactive device 16 may send information by various means, including, but not limited to audio, visual, and/or haptic feedback. The interactive device 16 may receive information from the driver and/or occupants of the vehicle 24 by means of audio or physical input, including, but not limited to voice input, buttons and knobs, and/or touch screens. It will be understood by those of skill in the art that the interactive device 16 may take many forms in the vehicle 24, including, but not limited to radios, infotainment systems, DVD players, video displays, navigational systems, cellular phone interfaces, and telematic systems. The interactive device 16 may be connected to the processing device 14 and receive data used to determine the current mode of operation for the interactive device 16.

An embodiment of the interactive device 16 may have at least two modes of operation. The interactive device 16 may be configured such that a first mode may allow full functionality of the interactive device 16, and a second mode may allow reduced functionality relative to the first mode. The types of functionality that may be reduced in the second mode may include functions that are deemed unnecessarily distractive to the driver of a moving vehicle 24. For example, functions that draw the driver's attention away from the road, such as touch-screen data entry, may be restricted while the interactive device 16 is in the second mode. While an example of the type of functionality that may be reduced has been provided, it should be understood that any function of the interactive device 16 may be restricted while the interactive device 16 is in the second mode as determined by those with skill in the art.

Although the foregoing description of the driver assistance detection system 10 describes a single vision-based detection device 12, the driver assistance detection system 10 may comprise a plurality of vision-based detection devices 12 in an embodiment of the invention. Referring to FIG. 2, the driver assistance detection system 10 may be installed in a vehicle 24. Each vision-based detection device 12 of the plurality of vision-based detection devices 12 may have a field of view 28. The field of view 28 (also known as a field of vision) is part of the environment surrounding the vehicle 24 that may be visible through each vision-based detection device 12 at a particular position and orientation in space. The field of view 28 is not planar, but three dimensional having not only a width, but height as well. In an embodiment, the field of view 28 may be described as substantially conical shaped. Each of the plurality of vision-based detection devices 12 may be configured to scan the surrounding environment of the vehicle 24 in a different direction and thus have a different field of view 28. For example, one of the plurality of vision-based detection devices 12 may be configured such that it has a first field of view 28 in a direction forward of the vehicle 24 and a second field of view 28 in a direction rearward of the vehicle 24. As described above, additional vision-based detection devices 12 may be utilized by the driver assistance detection system 10 and may be configured to obtain additional fields of view 28 to cover more of the surrounding environment around the vehicle 24. So, for example, although an object 26—in the form of an emergency response vehicle—is shown in the field of view directly behind the vehicle in FIG. 2, detection of objects, such as emergency vehicles (e.g., fire, police, ambulance, etc.), may also be performed in any additional directions around the vehicle by configuring fields of view 28 accordingly.

When an object 26 in the surrounding environment is within the field of view 28, the camera of the vision-based detection device 12 may detect the object 26 and the computing device of the vision-based detection device 12 may recognize if the object 26 is an object of interest. For example, some objects of interest may include, but are not limited to, a traffic signal, a railroad crossing signal, construction signal, and/or emergency response vehicles. When the object 26 is recognized as an object of interest, the vision-based detection device 12 may detect the status of the object 26 from relevant visual cues. For example, the traffic signal may have the status of a red light, a yellow light, a green light, a green arrow light, a flashing red light, a flashing yellow light, or lack of an active light perhaps due to power loss. For example, the railroad crossing signal may have a status of blinking lights, non-flashing lights, and/or a gate that may be raised or lowered. For example, the construction signal may have a status of a flashing light, a non-flashing light, and/or a direction arrow. For example, the emergency response vehicles may have a status of a flashing lights or non-flashing lights. While various statuses for the objects of interest have been disclosed, it should be appreciated that other statuses may exist as known by those of skill in the art.

In addition to the ability of the driver assistance detection system 10 to visually detect objects 26, it may also be possible for the objects 26 in the environment surrounding the vehicle to transmit a wireless signal sent from an object status transmitting device 30 that may be received by the driver assistance detection system 10. The wireless signal, originating from the object status transmitting device 30, may be encoded with data regarding the status of the object 26. The wireless signal may be a publicly available signal. For example, a traffic signal may have an object status transmitting device 30 that is transmitting a wireless signal containing data regarding what active signal is currently displayed on the traffic signal. Additionally, other objects 26 as described above or known by those of skill in the art may utilize the object status transmitting device 30.

To receive the data sent from the object status transmitting device 30, the driver assistance detection system 10 may include the auxiliary receiving device 22. The auxiliary receiving device 22 is an apparatus configured to receive the wireless signal transmitted from the object status transmitting device 30. After receiving the data sent from the object status transmitting device 30, the auxiliary receiving device 22 may be configured to send the data to the processing device 14. In an embodiment, the auxiliary receiving device 22 may be an antenna or any apparatus capable of receiving wireless signals known by those of skill in the art.

The data regarding the status of the object 26 sent from the object status transmitting device 30 may be used by the driver assistance detection system 10 in various ways. For example, the data obtained by the auxiliary receiving device 22 may be used to confirm the data obtained by the vision-based detection device 12. In an embodiment, when the data between the auxiliary receiving device 22 and the vision-based detection device 12 is conflicting, the processing device 14 may use the data that puts the interactive device 16 in the second mode (i.e., the mode with reduced functionality relative to the first mode) to provide a less distracting option to the driver. The data obtained by the auxiliary receiving device 22 may also be to determine whether a power saving mode for the driver assistance detection system 10 is desirable. In an embodiment, the vision-based detection device 12 may be placed in the standby mode when data regarding the object 26 has already been obtained by the auxiliary receiving device 22.

Figure 3:
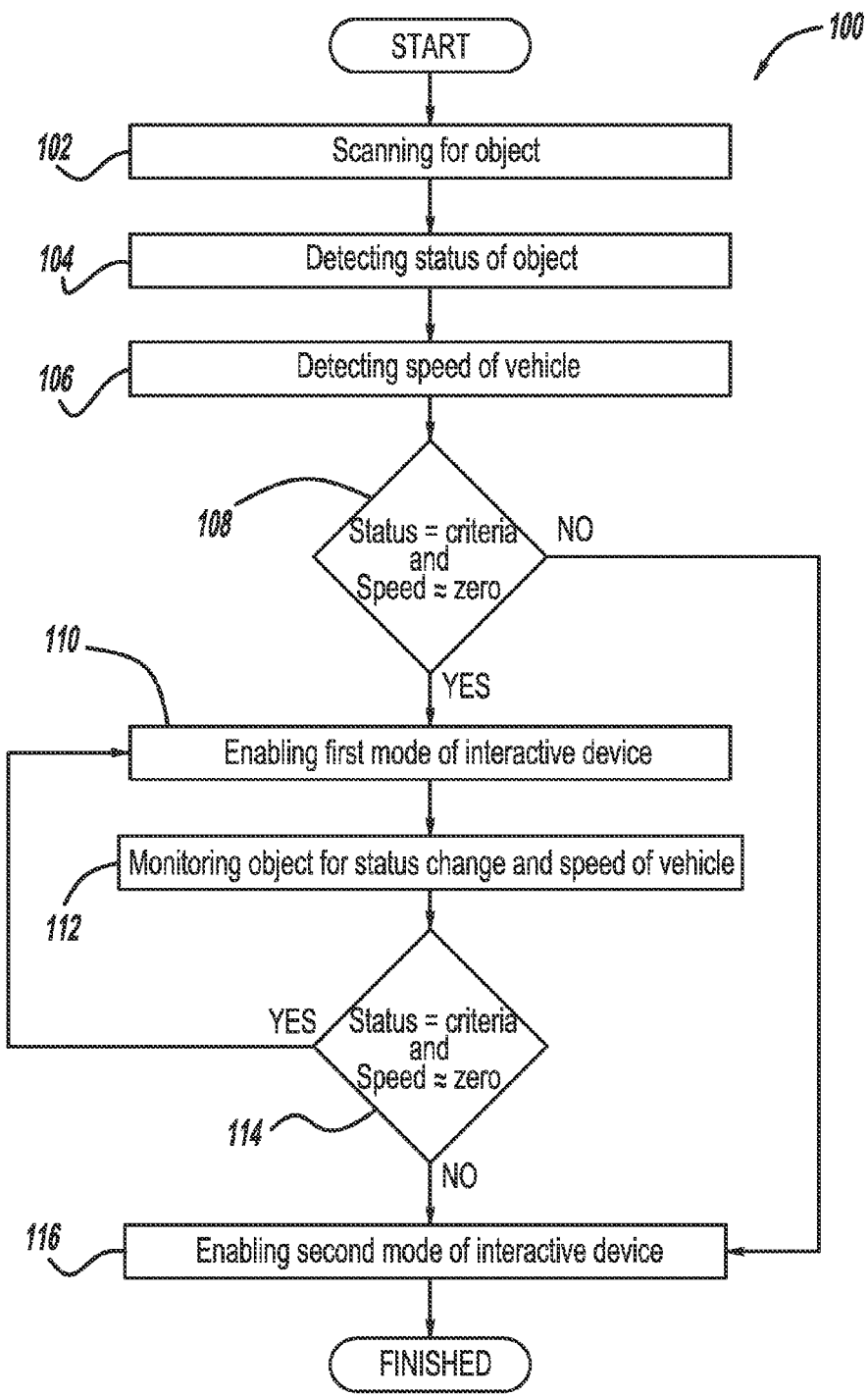
FIG. 3 is a flow chart generally illustrating the steps in a driver assistance detection method in accordance with an embodiment of the driver assistance detection system.

Referring to FIG. 3, with component reference to FIGS. 1 and 2, a driver assistance detection method for use with a driver assistance detection system 10 may be utilized. In accordance with an embodiment of the invention, the vision-based detection device 12 may visually detect the object 26, determine if the object 26 is recognized as an object of interest, visually obtain the status of object 26, and send data regarding the status of the object 26 to the processing device 14. The processing device 14 may execute a set of instructions based on the input from the vision-based detection device 12 and generate output that is provided to the interactive device 16. The interactive device 16 may switch to a particular mode based on the output from the processing device 14 which may assist the driver by reducing potential distractions in the vehicle 24 at required times. In particular, the processing device 14 may provide an output in the form of a requirement as to whether the interactive device 16 can operate in the first mode or the second mode.

FIG. 3 generally illustrates an embodiment of the driver assistance detection method. The driver assistance detection method 100 may be utilized when the driver assistance detection system 10 at least comprises the vision-based detection device 12, the processing device 14, and the interactive device 16. The vision-based detection device 12 may be connected to the processing device 14, and the processing device 14 may be connected to the interactive device 16 such that each component may communicate data.

The driver assistance detection method may begin at step 102 when the vision-based detection device 12 is active and visually scanning the surrounding environment. When an object 26 enters the field of view 28 of the vision-based detection device 12, the computing device of the vision-based detection device 12 will determine whether the object 26 is an object of interest by using the techniques described earlier or as known to those with skill in the art. If the object 26 is not recognized as an object of interest, the vision-based detection device 12 will continue scanning the surrounding environment. If the object 26 is an object of interest, the computing device of the vision-based detection device 12 will attempt to visually determine the status of the object 26. In step 104, the vision-based detection device 12 will look for predefined visual cues, such as flashing lights or the active light in a traffic signal. After the status of the object 26 has been determined, the vision-based detection device 12 will transmit the data regarding the object 26 and/or the status of the object 26 to the processing device 14. In those embodiments where the driver assistance detection system 10 also comprises the speed detection device 20, data regarding the current speed of the vehicle 24 will be transmitted to the processing device 14 in step 106.

In step 108, the processing device 14 will run a set of instructions using the data received from the vision-based detection device 12, and if applicable, the speed detection device 20. In the embodiment without the speed detection device 20, the processing device 14 will determine whether the object 26 and the status of the object 26 meet a predefined criteria. For example, the predefined criteria may be that the object 26 is a traffic signal with the status of a red light. Other predefined criteria may include, but are not limited to, objects 26 such as a railroad crossing warning signal with the status of flashing lights and/or gate lowered, and a construction warning sign with the status of flashing lights and/or a direction arrow. In an embodiment with the speed detection device 20, the processing device 14 may also require that the vehicle 24 has come substantially to a stop, or has a speed that is below a predefined threshold as part of the predefined criteria. When the processing device 14 determines that the predefined criteria has been met, output based on the data regarding the object 26 and/or the status of the object 26 may be sent to the interactive device 16 to enable the first mode.

In step 110, upon receiving output from the processing device 14 that the predefined criteria has been met, the interactive device 16 may enable the first mode and provide more functionality relative to the second mode. For example, if the vehicle 24 is stopped at a traffic signal that has the status of a red light, the interactive device 16 may allow the driver access to a touch screen to enter navigational information, such as destination information or enable video features of an infotainment system. While specific examples have been provided, it should be understood that other functions from various interactive devices 16 as known to those with skill in the art may become enabled in the first mode.

In step 112, while the interactive device 16 is in the first mode, the vision-based detection device 12 may monitor the object 26 to determine whether the status has changed. In the embodiment of the driver assistance detection system 10 which also includes the speed detection device 20, the speed of the vehicle 24 is also monitored for any substantial change.

In step 114, if the vision-based detection device 12 and/or speed detection device 20 detects a change in status and/or substantial change in the speed of the vehicle 24, the vision-based detection device 12 and/or speed detection device 20 may send this data regarding the new status of the object 26 to the processing device 14. The processing device 14 may again determine whether the predefined criteria is still met. If the predefined criteria is still met, then the interactive device 16 may be allowed to remain in the first mode and steps 110 and 112 may be repeated. If the predefined criteria is no longer met, then the processing device 14 will send output to the interactive device 16 to enable the second mode.

In step 116, upon receiving output from the processing device 14 that the predefined criteria has not been met, the interactive device 16 may enable the second mode and provide less functionality relative to the first mode. For example, if the vehicle 24 is stopped at a traffic signal where the status has changed from a red light to a green light, the interactive device 16 may disable the touch screen interface that allows the driver access to enter navigational information, such as destination information. Additionally, in some embodiments, the interactive device 16 may send a warning signal to the driver to draw the driver's attention to a change in traffic situation. While examples of reduced functionality have been provided, it should be understood that other functions from various interactive devices 16 as known by those with skill in the art may become disabled while in the second mode of the interactive device 16.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A driver assistance detection system for a vehicle having a driver, the system comprising:
    a vision-based detection device, wherein the vision-based detection device is configured to visually detect an object and visually obtain data regarding a status of the object;
    an interactive device having a first mode and a second mode, wherein the second mode is configured to have reduced functionality relative to the first mode;
    a processing device, wherein the processing device is configured to receive data regarding the status of the object and output one of the first mode and the second mode for the operation of the interactive device based at least in part on the data regarding the status of the object obtained from the vision-based detection device; and
    a speed detection device configured to provide data regarding a speed of the vehicle, and wherein the processing device is configured to receive the data regarding the speed of the vehicle from the speed detection device and switch the interactive device between the first mode and the second mode based further on the data regarding the speed of the vehicle;
    wherein the object is a traffic signal and the status of the traffic signal to be obtained by the vision-based detection device is red, yellow, or green; and
    wherein the processing device is configured to output the first mode for operation of the interactive device when the status of the traffic signal is red and the speed of the vehicle is about zero.

2. A system according to claim 1, further comprising a vehicle positioning device, wherein:
    the vehicle positioning device is configured to provide data regarding a known location of the object; and
    the vision-based detection device is configured to receive the data regarding the known location of the object.

3. A system according to claim 1, wherein the processing device is integrated with a vehicle telematic system.

4. A system according to claim 1, wherein the vision-based detection device is configured to detect the object in a field of view forward of the vehicle.

5. A system according to claim 1, further comprising a plurality of vision-based detection devices, wherein the plurality of vision-based detection devices have a plurality of corresponding fields of view.

6. A system according to claim 5, wherein at least one of the plurality of vision-based detection devices comprises a first vision-based detection device configured to detect the object in a first field of view forward of the vehicle, and wherein at least one of the plurality of vision-based detection devices comprises a second vision-based detection device configured to detect the object in a second field of view rearward of the vehicle.

7. A system according to claim 1, wherein the interactive device is further configured to alert the driver when the operation of the interactive device shifts from the first mode to the second mode and the interactive device is configured to be operable in the first mode only if the speed of the vehicle is about zero.

8. A system according to claim 1, wherein the interactive device is configured to be operable only in the second mode if the speed of the vehicle is greater than about zero.

9. A system according to claim 1, wherein the processing device is configured to output the second mode for operation of the interactive device when the status of the traffic signal is not red.

10. A system according to claim 1, wherein the object is a railroad crossing signal and the status of the traffic signal to be obtained by the vision-based detection device is flashing lights or non-flashing lights.

11. A system according to claim 10, wherein the processing device is configured to output the first mode for operation of the interactive device when the status of the railroad crossing signal is flashing and the speed of the vehicle is about zero.

12. A system according to claim 10, wherein the processing device is configured to output the second mode for operation of the interactive device when the status of the railroad crossing signal is not flashing.

13. A system according to claim 1, wherein the object is a construction zone warning sign and the status of the construction zone warning sign to be obtained by the vision-based detection device is flashing lights, non-flashing lights, or arrow lights.

14. A system according to claim 1, wherein the object is an emergency vehicle and the status of the emergency vehicle to be obtained by the vision-based detection device is flashing lights or non-flashing lights.

15. A driver assistance detection system for a vehicle having a driver, the system comprising:
    a vision-based detection device, wherein the vision-based detection device is configured to visually detect an object and visually obtain data regarding a status of the object;
    an auxiliary receiving device, wherein the auxiliary receiving device is configured to receive a wireless signal encoded with auxiliary data regarding a status of the object from an object status transmitting device located proximate to the object;
    an interactive device having a first mode and a second mode, wherein the second mode is configured to have reduced functionality relative to the first mode; and
    a processing device, wherein the processing device is configured to receive data regarding the status of the object and auxiliary data regarding the status of the object and output one of the first mode and the second mode for operation of the interactive device based at least in part on the data regarding the status of the object or the auxiliary data regarding the status of the object.

16. A method for assisting a driver of a vehicle, comprising:
    scanning the surroundings of the vehicle with a vision-based detection device for an object;
    visually detecting an object having more than one status;
    visually detecting a first status of the object with the vision-based detection device;
    determining if the first status of the object meets a predefined criteria;

outputting one of a first mode and a second mode for operation of an interactive device based at least in part on the first status of the object wherein the second mode is configured to have reduced functionality relative to the first mode and, wherein the interactive device is enabled to operate in the first mode only if the first status of the object meets the predefined criteria;

visually monitoring the object to detect a change in the status of the object from the first status to a second status;

determining if the second status of the object meets the predefined criteria;

and outputting one of the first mode and the second mode for operation of the interactive device based at least in part on the second status of the object, wherein the interactive device is enabled to operate in the first mode only if the second status of the object meets the predefined criteria.

17. The method according to claim 16, further comprising:

detecting a speed of the vehicle with a speed detection device; and enabling the interactive device to be operable in the first mode only if the speed of the vehicle is about zero.

\* \* \* \* \*